United States Patent [19]
Suikkola et al.

[11] Patent Number: 5,678,195
[45] Date of Patent: Oct. 14, 1997

[54] METHOD OF INFORMING A SUBSCRIBER IN A RADIO TELEPHONE SYSTEM OF FACILITIES ACTIVATED FOR THE SUBSCRIBER STATION

[75] Inventors: Rauno Suikkola, Espoo; Hannu Töyrylä, Vantaa, both of Finland

[73] Assignee: Nokia Telecommunications Oy, Espoo, Finland

[21] Appl. No.: 325,292

[22] PCT Filed: Mar. 1, 1994

[86] PCT No.: PCT/FI94/00074

§ 371 Date: Oct. 27, 1994

§ 102(e) Date: Oct. 27, 1994

[87] PCT Pub. No.: WO94/21075

PCT Pub. Date: Sep. 15, 1994

[30] Foreign Application Priority Data

Mar. 4, 1993 [FI] Finland .................. 930972

[51] Int. Cl.⁶ .................. H04B 1/00; H04B 7/26
[52] U.S. Cl. .................. 455/54.1; 455/54.2; 455/56.1
[58] Field of Search .................. 455/54.1, 54.2, 455/56.1, 59, 33.1; 379/59, 60, 188, 189, 200, 212

[56] References Cited

U.S. PATENT DOCUMENTS

| | | | |
|---|---|---|---|
| 4,680,785 | 7/1987 | Akiyama et al. | 379/57 |
| 4,811,420 | 3/1989 | Avis et al. | 455/56.1 |
| 4,827,501 | 5/1989 | Hansen | 379/188 |
| 4,833,701 | 5/1989 | Comroe et al. | 379/60 |
| 4,850,032 | 7/1989 | Freeburg | 455/56.1 |
| 5,153,906 | 10/1992 | Akiyama | |
| 5,157,661 | 10/1992 | Kanai et al. | 370/95.1 |
| 5,339,353 | 8/1994 | Asahara et al. | 455/54.1 |
| 5,408,683 | 4/1995 | Ablay et al. | 455/54.1 |
| 5,436,962 | 7/1995 | Hirata | 379/212 |

FOREIGN PATENT DOCUMENTS

| | | |
|---|---|---|
| 0365200 | 4/1990 | European Pat. Off. . |
| 0450550 | 10/1991 | European Pat. Off. . |
| 0542049 | 5/1993 | European Pat. Off. . |
| 404152724 | 5/1992 | Japan . |
| 405219236 | 8/1993 | Japan . |

*Primary Examiner*—Chi H. Pham
*Assistant Examiner*—Gertrude Arthur
*Attorney, Agent, or Firm*—Cushman Darby & Cushman Intellectual Property Group of Pillsbury Madison & Sutro LLP

[57] ABSTRACT

A method for use in a radio system that includes a subscriber database containing data informing of facilities activated for the subscriber, exchanges, base stations and subscriber stations. In order to keep the subscriber stations informed of the facilities activated therefor, the facility data for a given subscriber station are read from the subscriber data base of the radio system and the data are sent as a facility data message through a base station via a radio path to the subscriber station, the subscriber station receives the message containing the facility data and presents these data to the subscriber.

1 Claim, 1 Drawing Sheet

METHOD OF INFORMING A SUBSCRIBER IN A RADIO TELEPHONE SYSTEM OF FACILITIES ACTIVATED FOR THE SUBSCRIBER STATION

BACKGROUND OF THE INVENTION

The invention relates to a method in a radio system, comprising a subscriber database containing data informing of facilities activated for the subscriber, exchanges, base stations and subscriber stations, for keeping the subscriber stations informed of the facilities activated therefor.

A typical feature of subscriber stations of radio telephone systems, i.e. radio telephones or other such terminals, is that the subscriber stations move within and from a network area, being sometimes outside the coverage area of the network and thus losing connection with the network. Due to the fact that a radio telephone may move and operate in the radio network area of several different operators and that there is no data communication between the exchanges of the radio networks, terminals, i.e. radio telephones moving at times in the area of other radio networks, may lose connection with their own actual home radio telephone network. For this reason, a radio telephone and its user have data of facilities and services activated for radio telephones which are different from respective data contained in the exchange of the home radio telephone network of the radio telephone.

Another typical feature of radio terminals is that they are used periodically, which means that they they are at times switched on and in communication with their own radio telephone network and at times switched off, closed, and thus without communication with the radio telephone network. Additionally, radio telephones may sometimes lose connection with the radio telephone network, because a radio telephone power source, typically a battery, runs out of power. Furthermore, one radio telephone may have several users in some cases, a typical example of which is common use of a radio telephone in a company.

On account of the above facts, there is also a risk that a radio terminal and its user, on the one hand, and an exchange of a radio telephone system and an associated database, on the other hand, have different information of which operations have been programmed in the terminal to be implemented by the exchange of the radio telephone network. The user of a radio terminal, for instance, may then believe that no call transfer has been activated for calls addressed to their terminal, even though it is so in reality, and accordingly, the subscriber waits for calls to come to his or her terminal in vain, since these calls have been transferred elsewhere. In addition to the call transfer facility or call diversion facility, being a facility by means of which incoming calls can be transferred to an exchange, to a call request service implemented in connection with the exchange or to another subscriber number, there are other services implemented by the exchange and to be activated for the subscriber, whereby it is of utmost importance for the subscriber using the subscriber unit to know of an activation, i.e. a status, of these services. A further telecommunications service of this kind is a call restriction facility restricting outgoing and incoming calls. Call restrictions are, e.g., a barring of long-distance and international calls and a barring of incoming or outgoing calls. Such a call restriction may, for instance, be activated if the subscriber has not paid his or her telephone bill. Another example of the call restriction facility may be a facility preventing the subscriber from using his or her terminal for other purposes than for emergency calls. Except for these above-mentioned facilities, a large number of other facilities and telecommunications services to be provided by means of these facilities exist or are developed just now, whereby the subscriber using the terminal should know of the activation or status of these services as far as his or her particular terminal is concerned.

According to the prior art, various attempts have been made to satisfy the above need of the subscriber to be informed of which telecommunications services and associated facilities have been activated for the terminal used by the subscriber.

One solution according to the prior art is to store the data of the telecommunications services activated for the subscriber, i.e. of the facilities activated for the terminal concerned, in a memory contained in the terminal, which memory is maintained by means of battery backup, e.g. during the time a battery of the terminal is changed. A drawback of this solution is that, because the control of status data, i.e. service data, and facility data is distributed both to the exchange and the terminal of the radio system, the terminal may contain data of the services and facilities activated for the terminal or the subscriber which are different from the data contained in the exchange of the radio system. This is the case, for instance, when the radio telephone is serviced, when some previous user of the radio telephone activates or deactivates facilities or services, and at the end of battery backup. Then, the latter user of the radio telephone may, for instance, believe that the call transfer facility is not activated, even if this facility actually is activated and the calls addressed to the subscriber unit are transferred to some other receiver. Moreover, such a battery backup does not work in all situations and it is also problematic, if one terminal operates in the area of several radio networks alternately.

Another prior art solution to how the user of a terminal can be informed of the telecommunications services or facilities activated for the subscriber concerned, is a solution according to which the subscriber may at his or her own manual request receive from a mobile telephone exchange a speech message indicating which facilities have been activated for the terminal concerned. Such a method is used by the NMT (Nordic Mobile Telephone System) system, for instance. A drawback of this solution is that personal activity is always required of the subscriber using the terminal, because it presupposes that the user remembers and uses actively and independently this manual operation, by which the user requests the exchange to give the speech message. Unfortunately, operations performed by the user himself or herself are dependent on human factors and thus incomplete.

SUMMARY OF THE INVENTION

The object of this invention is to avoid the above-mentioned problems occurring in the solutions according to the prior art. Consequently, the object of the present invention is to offer the user of the radio terminal, i.e. the subscriber, a method, by means of which the subscriber is informed of the facilities activated for the terminal used by the subscriber.

This novel method according to the invention is characterized in that facility data for a given subscriber station are read from the subscriber data base of the radio system and that such data are sent as a facility data message through a base station via a radio path to the subscriber station, and the subscriber station receives the respective message containing the facility data and presents these data to the subscriber.

The invention is based on the idea that an information of the facilities activated for the subscriber unit concerned are included in a signalling going to a radio terminal, i.e. a subscriber station. Upon receiving the signalling message containing that information, the subscriber terminal discloses the information of the services activated for the terminal, to the subscriber.

An advantage of such a method is that it eliminates the problems occurring in the solutions according to the prior art. In practice, the solution of the invention gives a subscriber of a radio terminal a possibility of knowing which facilities are activated in an exchange of a radio system or a subscriber data base of the exchange for the terminal used by the subscriber. Accordingly, the data contained in the subscriber data base in the exchange of the radio system or in connection therewith are utilized automatically in such a way that better services are produced for the subscribers of the radio system. By means of an automatic data transmission performed by the system according to the invention, the data indicating the facilities activated for the terminal, the previous manual request of the user for activated facilities can be replaced by an automatic operation performed by a computer present in the system, without the user, i.e. the subscriber, having to remember it.

BRIEF DESCRIPTION OF THE DRAWINGS

In the following the invention will be explained in more detail with reference to the attached drawings, in which.

DETAILED DESCRIPTION

Figure 1:
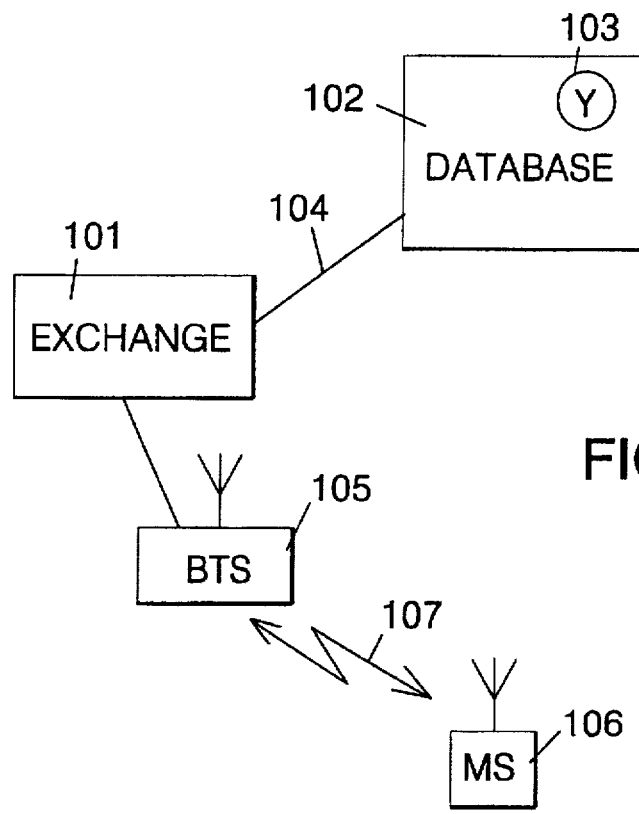
FIG. 1 shows a block diagram of a situation according to the prior art, in which a subscriber station is not informed of the facilities activated therefor.

FIG. 1 shows a block diagram of a situation according to the prior art, in which a subscriber station MS 106 does not obtain information of the facilities activated therefor. An information Y 103 of the facilities activated for the subscriber station MS 106 is stored in a data base 102 of the radio system. The data base may exist in connection with an exchange 101, or somewhere else within the range of the radio system. The data base 102 is typically a subscriber data base containing subscriber data of the subscribers belonging to the system. In the solution according to the prior art, the information Y 103 of the facilities activated for the subscriber station MS 106 is not transmitted automatically through a base station BTS 105 via a radio path 107 to the subscriber station MS 106, which is a mobile station or a radio terminal or a radio telephone. At the subscriber's, i.e. the user's, command, the subscriber station 106 may certainly make a request for information of the facilities determined therefor, but such a request is manual and requires a measure to be taken by the user himself or herself. Operations performed by the user himself or herself are dependent on the carefulness and the memory of the user, and furthermore, such operations are laborious and insecure.

Figure 2:
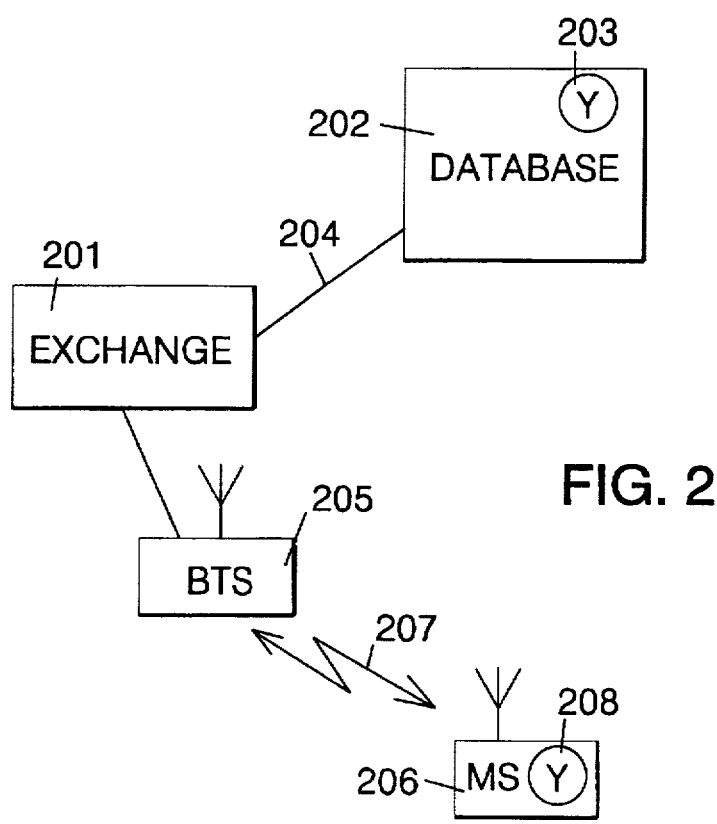
FIG. 2 shows a block diagram of a situation according to the invention, in which the subscriber station is informed of the facilities activated therefor.

FIG. 2 shows a block diagram of a situation according to the invention, in which an information Y of the facilities activated for a subscriber station MS 206 is transmitted thereto. These facilities can be activated by an exchange of the radio system commanded by a radio terminal and, e.g., its user, by the exchange of the radio system independently or by some other entity in connection with the radio system. In the method of the invention, subscriber data of the subscriber and the terminal and an information Y 203 of the facilities activated for the respective subscriber/terminal, i.e. the facility data Y 203 of the respective subscriber/terminal, are stored in a data base 202. In the method of the invention, the exchange requests the data base located either in the exchange or within the reach of telecommunication therefrom for the information Y of the facilities activated for the subscriber MS and sends this information as a facility data message through a base station BTS 205 via a radio path 207 to the subscriber station MS 206. The subscriber station discloses the received facility data Y 208 by means of a user interface to the subscriber, who is able to change his or her behaviour on account of these data. The facility data message contains at least the following data, which may be arranged in blocks:

1. a message identifier indicating that the message is a facility data message, 2. a subscriber number indicating to which subscriber the message is addressed, 3. facility data desired, i.e. status data of the services or facilities activated for the subscriber indicated by the subscriber number, 4. other possible parameters and other information, e.g. time by the clock and the time during which the indicated services are valid.

In the following is presented a practical example of a set of information given by means of a facility data message, by which a subscriber is informed of a call transfer service activated for this subscriber. An information of whether a call transfer facility is activated for the subscriber and possibly also the subscriber number (telephone number) to which the calls are transferred are then transmitted as a facility data message to the subscriber. The user of the radio telephone typically transfers his or her incoming calls to another subscriber number, e.g. to a fixed telephone network, by switching off the current of his or her radio telephone, for instance when he or she leaves the car in which the mobile phone is located. The information of the call transfer is stored in a data base in connection with the exchange of the radio telephone system. Due to this call transfer facility activated for the subscriber, all calls coming to the subscriber are then transferred to the new number. Because the system sends the facility data message to the terminal of the subscriber, the terminal now receives the information of the call transfer activated for the subscriber/terminal (or of some other activated facility, correspondingly) and transmits this information by means of a user interface of the radio terminal to the subscriber. The user interface may be a display, for instance, but it may also be some other manner of informing the subscriber of the facility activated.

A facility data message may be transmitted to the radio terminal of the subscriber when the subscriber tries to use a service or facility which is prevented (i.e. which has not been activated or which has been prevented by activation) or a service having a logical connection with activation data of some facility. Further, a facility data message may be transmitted to the terminal of the subscriber under time control of some kind at regular or irregular intervals, or when there is suitable free signalling capacity on the radio path. Moreover, a status data message may be transmitted to the terminal of the subscriber when either the subscriber or the terminal of the subscriber requests facility data concerning the subscriber or the terminal of the subscriber by sending a facility data request message to the radio system, typically to the exchange of the system. Additionally, a transmission of facility data to the subscriber stations may take place after the exchange of the radio system has been informed by means of signalling of the fact that the subscriber data of the subscriber station has been location updated, for example when the subscriber station has entered the radio system or when the subscriber station enters the radio system.

The method according to the invention is intended to be implemented in practice in such a way that the exchange of the radio system comprises software performing the transmission of data to the radio terminal either responsive to its own time control, or responsive to requests made by the subscriber, or to an attempt of the subscriber to use some service/facility. Additionally, the software is capable of controlling the subscriber data stored in the data base and of searching for correct data therein, if needed. Further, the exchange of the radio system has software implementing a novel kind of signalling between the radio telephone and the exchange. In addition to this, the radio terminal comprises software, which processes the facility data message sent by the exchange and is capable of presenting the data contained in that message to the user. Moreover, this software is capable of setting up a facility data request message, if it is desirable that facility data be sent to the subscriber terminal also at the subscriber's command.

New additional data base may possibly be necessary in connection with the exchange of the radio system for the implementation of the invention, which means that more equipment is needed. It is also possible that the radio terminal is provided with an additional display device, by means of which the subscriber detects the data of the facilities activated for the subscriber/terminal. Further, this solution may be implemented in such a manner that the data bases controlling the subscriber data are distributed to several exchanges, for which purpose is needed a software controlling the subscriber data bases distributed to several exchanges or in connection therewith, and the facility data contained therein.

The drawings and the description attached thereto are only intended to illustrate the idea of the invention. As to the details, the method of the invention may vary within the scope of the claims. Even though the invention has been described above in connection with radio systems in the first place, the method according to the invention may also be used in other systems of mobile telecommunication.

We claim:

1. A method for informing a subscriber in a mobile communications system, of facilities activated for a mobile station serving the subscriber, the method comprising the steps of:

(a) providing a mobile communication system in which there is at least one exchange which serves at least one base station and there is at least one mobile station serving a respective subscriber and arranged to move into and out of an area served by said at least one base station;

(b) effectively associating a mobile subscriber database with said at least one exchange, and operating that database in such a manner as to keep the data base updated with facility data as to at least one of facilities and services activated for and, thus, available to each said respective subscriber;

(c) upon occurrence of an event related to a respective said mobile station, said event being one of:
  (i) an attempt by the respective subscriber or respective mobile station to use a service or facility which is not activated for the respective mobile station,
  (ii) a location updating of the respective mobile station in relation to said system or said base station,
  (iii) elapsing of a given amount of time, and
  (iv) coming into existence of free signalling capacity in said system, effectively in relation to transmission to the respective said mobile station, reading respective facility data from said data, and causing sending by the respective exchange of a respective said base station, over a radio path, from that base station to the respective said mobile station, of a facility data message containing respective said facility data;

(d) receiving by the respective said mobile station of said facility data message; and (e) displaying by the respective said mobile station to the respective said subscriber, of at least some of the facility data received in said facility data message, including information as to status of activation for the respective mobile station, as used by the respective subscriber, of at least one of call transfer, and call restriction as to barring of at least one of long distance and international calls, barring of at least one of incoming and outgoing calls, and barring of all except emergency calls.

* * * * *